United States Patent
Geng et al.

(10) Patent No.: US 11,722,072 B2
(45) Date of Patent: Aug. 8, 2023

(54) INVERTER CIRCUIT CONTROL METHOD AND DEVICE THEREOF

(71) Applicant: Sungrow Power Supply Co., Ltd., Hefei (CN)

(72) Inventors: Houlai Geng, Hefei (CN); Xing Li, Hefei (CN); Menglin Cao, Hefei (CN); Lin Cheng, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 17/592,544

(22) Filed: Feb. 4, 2022

(65) Prior Publication Data

US 2022/0329176 A1 Oct. 13, 2022

(30) Foreign Application Priority Data

Apr. 13, 2021 (CN) .......................... 202110394426.X

(51) Int. Cl.
*H02M 7/49* (2007.01)
*H02M 7/483* (2007.01)
*H02M 7/501* (2007.01)

(52) U.S. Cl.
CPC ............ *H02M 7/501* (2013.01); *H02M 7/49* (2013.01); *H02J 2300/24* (2020.01)

(58) Field of Classification Search
CPC ......... H02M 7/483; H02M 7/49; H02M 7/501
See application file for complete search history.

(56) References Cited

U.S. PATENT DOCUMENTS

| 9,755,545 B2 * | 9/2017 | Lei ........................ H02M 1/12 |
| 2008/0298103 A1 * | 12/2008 | Bendre ................. H02M 7/487 363/97 |

(Continued)

FOREIGN PATENT DOCUMENTS

| CN | 102291030 A | 12/2011 |
| CN | 103023364 A | 4/2013 |

(Continued)

OTHER PUBLICATIONS

Extended European Search Report for European Application No. 22151248.6, dated Jun. 24, 2022.

(Continued)

*Primary Examiner* — Sisay G Tiku
(74) *Attorney, Agent, or Firm* — Wolf, Greenfield & Sacks, P.C.

(57) ABSTRACT

An inverter circuit control method and a device thereof are provided. In the control method, after determining a DC bus voltage and an output leakage current of a target inverter circuit, a modulation harmonic wave to be injected into a SPWM signal is adjusted according to the DC bus voltage or the output leakage current if it is determined according to the DC bus voltage that the target inverter circuit satisfies a preset modulation condition, such that total harmonic distortion of a current of the target inverter circuit is within a preset range. The DC bus voltage and the output leakage current of the target inverter circuit are used as references for adjusting the modulation harmonic wave, ensuring total harmonic distortion of the current of the target inverter circuit to be within a preset range.

20 Claims, 4 Drawing Sheets

(56) References Cited

U.S. PATENT DOCUMENTS

| | | | | |
|---|---|---|---|---|
| 2013/0329471 A1* | 12/2013 | Escobar | ................ | H02M 7/42 |
| | | | | 363/40 |
| 2015/0008750 A1* | 1/2015 | Shen | ................ | H02M 7/483 |
| | | | | 307/82 |
| 2016/0126862 A1* | 5/2016 | Vahedi | ................ | H02M 7/537 |
| | | | | 363/131 |
| 2017/0201189 A1 | 7/2017 | Li et al. | | |
| 2019/0319550 A1* | 10/2019 | Watanabe | ............ | H02M 1/143 |
| 2021/0351689 A1* | 11/2021 | Chai | ................ | H02M 7/537 |

FOREIGN PATENT DOCUMENTS

| | | | | | |
|---|---|---|---|---|---|
| CN | 106787870 | A | | 5/2017 | |
| CN | 108879906 | A | * | 11/2018 | ............ H01F 19/00 |
| CN | 109347354 | A | | 2/2019 | |
| CN | 109905051 | A | | 6/2019 | |
| CN | 112383238 | A | * | 2/2021 | ............ H02J 3/381 |
| CN | 114759818 | A | * | 7/2022 | |
| DE | 4042001 | C2 | * | 1/1994 | ............ H02M 7/487 |
| EP | 2 672 621 | A1 | | 12/2013 | |
| EP | 2634909 | B1 | * | 2/2017 | ............ H02M 1/12 |
| EP | 3 496 257 | A1 | | 6/2019 | |
| EP | 3496257 | A1 | * | 6/2019 | .......... H02M 7/4833 |

OTHER PUBLICATIONS

Rahim et al., Transistor-clamped H-bridge based cascaded multi-level inverter with new method of capacitor voltage balancing. IEEE Transactions on Industrial Electronics. Jun. 12, 2012;60(8):2943-56.

* cited by examiner

INVERTER CIRCUIT CONTROL METHOD AND DEVICE THEREOF

The present disclosure claims priority to Chinese Patent Application No. CN202110394426.X, titled "INVERTER CIRCUIT CONTROL METHOD AND DEVICE THEREOF", filed on Apr. 13, 2021 with the China National Intellectual Property Administration, which is incorporated herein by reference in its entirety.

TECHNICAL FIELD

The present disclosure relates to the field of photovoltaic technology, and in particular to an inverter circuit control method and a device thereof.

BACKGROUND

Three-phase N-level inverters are widely used for the advantages such as multiple inverter levels, low harmonic amount, high power conversion efficiency, possibility to build inverter circuits with low withstand voltage transistors through capacitor clamping. FIG. 1 is a schematic topology diagram of a conventional N-level inverter, where N is equal to or greater than 3. Bus capacitors C1 and C2 connected in series are located on the direct current (DC) side of the N-level inverter, and a connection point of the two bus capacitors is connected to a bridge arm of the N-level inverter.

Generally sinusoidal pulse width modulation (SPWM) signals are used in conventional inverter circuit control method for controlling a working process of the N-level inverter as shown in FIG. 1. Due to the low utilization of an DC voltage in the control process based on SPWM signals, a third harmonic frequency/triple frequency modulation harmonic wave is usually injected into SPWM signal of each phase to increase a modulation ratio of a three-phase inverter, thereby improving the utilization of the DC voltage.

Capacitances of the bus capacitors C1 and C2 are relatively small in consideration of the hardware cost, thus the bus voltage will fluctuate greatly in the conventional inverter circuit control method. Voltages of the bus capacitors will fluctuate at triple frequency, and the smaller the capacitances are, the greater the fluctuation of the voltages of the bus capacitors will be. In turn, the inverter may encounter a large total harmonic distortion in current, even to an extent of unfulfilling industry standard and being disused.

SUMMARY

The present disclosure provides an inverter circuit control method and a device thereof, in which a modulation harmonic wave to be injected into a SPWM signal is adjusted according to an DC bus voltage or an output leakage current of an inverter circuit, such that total harmonic distortion of a current of the inverter circuit is within a preset range without increasing hardware cost.

To achieve the above objective, following technical solutions are provided by the present disclosure.

In a first aspect of the present disclosure, there is provided an inverter circuit control method including: determining a direct current (DC) bus voltage and an output leakage current of a target inverter circuit; determining whether the target inverter circuit satisfies a preset modulation condition according to the DC bus voltage; and adjusting a modulation harmonic wave to be injected into a sinusoidal pulse width modulation (SPWM) signal according to the DC bus voltage or the output leakage current in a case that the target inverter circuit satisfies the preset modulation condition, such that total harmonic distortion of a current of the target inverter circuit is within a preset range.

Optionally, the DC bus voltage includes a positive half-loop bus voltage and a negative half-loop bus voltage; and the determining whether the target inverter circuit satisfies a preset modulation condition according to the DC bus voltage includes:

calculating a difference between the positive half-loop bus voltage and the negative half-loop bus voltage as a target voltage difference;

determining that the target inverter circuit satisfies the preset modulation condition in a case that an absolute value of the target voltage difference is greater than a preset voltage threshold; and determining that the target inverter circuit does not satisfy the preset modulation condition in a case that the absolute value of the target voltage difference is less than or equal to the preset voltage threshold.

Optionally, the adjusting a modulation harmonic wave to be injected into a SPWM signal according to the DC bus voltage or the output leakage current includes:

adjusting the modulation harmonic wave to be injected into the SPWM signal according to the absolute value of the target voltage difference in a case that the output leakage current is less than or equal to a preset current threshold; and adjusting the modulation harmonic wave to be injected into the SPWM signal according to the output leakage current in a case that the output leakage current is greater than the preset current threshold.

Optionally, the adjusting the modulation harmonic wave to be injected into the SPWM signal according to the absolute value of the target voltage difference includes:

determining a target harmonic wave amplitude corresponding to the target voltage difference according to a first preset mapping relationship, wherein the first preset mapping relationship records a correspondence relationship between an absolute value of a difference between the positive half-loop bus voltage and the negative half-loop bus voltage and a harmonic wave amplitude, and the harmonic wave amplitude is positively correlated with the difference between the positive half-loop bus voltage and the negative half-loop bus voltage; and adjusting an amplitude of the modulation harmonic wave to be injected into the SPWM signal to the target harmonic wave amplitude.

Optionally, in the first preset mapping relationship, the correspondence relationship between the absolute value of the difference between the positive half-loop bus voltage and the negative half-loop bus voltage and the harmonic wave amplitude includes at least one of a linear correspondence relationship, a non-linear correspondence relationship, and a stepping correspondence relationship.

Optionally, a maximum value of the harmonic wave amplitude is half of a voltage peak value of alternating current (AC) power grid.

Optionally, the adjusting the modulation harmonic wave to be injected into the SPWM signal according to the absolute value of the target voltage difference includes: adjusting phase of the modulation harmonic wave to be injected into the SPWM signal according to the absolute value of the target voltage difference.

Optionally, the adjusting the modulation harmonic wave to be injected into the SPWM signal according to the output leakage current includes:

determining a target harmonic wave amplitude corresponding to the output leakage current according to a second preset mapping relationship, wherein the second preset mapping relationship records a correspondence relationship between an output leakage current of the target inverter circuit and a harmonic wave amplitude, and the harmonic wave amplitude is negatively correlated with the output leakage current of the target inverter circuit; and adjusting an amplitude of the modulation harmonic wave to be injected into the SPWM signal to be the target harmonic wave amplitude.

Optionally, in the second preset mapping relationship, the correspondence relationship between the output leakage current of the target inverter circuit and the harmonic wave amplitude comprises at least one of a linear correspondence relationship, a non-linear correspondence relationship, and a stepping correspondence relationship.

Optionally, the inverter circuit control method according to the first aspect of the present disclosure further includes:

monitoring the DC bus voltage; and increasing the DC bus voltage in a case that the DC bus voltage is less than a preset safety threshold.

Optionally, the inverter circuit control method according to the first aspect of the present disclosure further includes: controlling operation of the target inverter circuit according to the SPWM modulation signal in a case that the target inverter circuit does not satisfy the preset modulation condition.

In a second aspect of the present disclosure there is provided an inverter including an inverter circuit and a controller, where the controller is connected to a control end of the inverter circuit, and the controller is configured to implement any inverter circuit control method according to the first aspect of the present disclosure.

Optionally, the inverter circuit includes a three-phase N-level inverter circuit, where N is greater than or equal to 3.

In a third aspect of the present disclosure there is provided a photovoltaic system including at least one photovoltaic module, a combiner, and the inverter according to the second aspect of the present disclosure, where an output end of each photovoltaic module is connected to an input end of the combiner, an output end of the combiner is connected to DC side of the inverter; and AC side of the inverter is connected to AC power grid.

In the inverter circuit control method provided in the present disclosure, after determining a DC bus voltage and an output leakage current of a target inverter circuit, a modulation harmonic wave to be injected into a SPWM signal is adjusted according to the DC bus voltage or the output leakage current if it is determined that the target inverter circuit satisfies a preset modulation condition according to the DC bus voltage, such that total harmonic distortion of a current of the target inverter circuit is within a preset range. Since the injection of the modulation harmonic wave into the SPWM signal has a great impact on the DC bus voltage and the output leakage current, the DC bus voltage and the output leakage current of the target inverter circuit are used as references for adjusting the modulation harmonic wave in the inverter control method provided in the present disclosure. The modulation harmonic wave to be injected into the SPWM signal is adjusted according to the DC bus voltage or the output leakage current, thereby ensuring total harmonic distortion of the current of the target inverter circuit to be within the preset range to meet application requirements without increasing capacity of the bus capacitance, that is, without increasing hardware cost.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below show merely some embodiments of the present disclosure, and those skilled in the art may obtain other drawings according to the provided drawings without any creative effort.

DETAILED DESCRIPTION OF EMBODIMENTS

Technical solutions of embodiments of the present disclosure are clearly and completely described below in conjunction with the drawings of the embodiments of the present disclosure. Apparently, the embodiments described in the following are only some embodiments of the present disclosure, rather than all the embodiments. Any other embodiments obtained by those skilled in the art based on the embodiments in the present disclosure without any creative effort fall within the scope of the present disclosure.

The inverter circuit control method according to each embodiment of the present disclosure may be applied to a controller in an inverter; alternatively, it may also be applied to other controllers that can send a sinusoidal pulse width modulation (SPWM) signal to the inverter circuit. In some cases, the inverter circuit control method may be applied to a server on network side.

Figure 2:
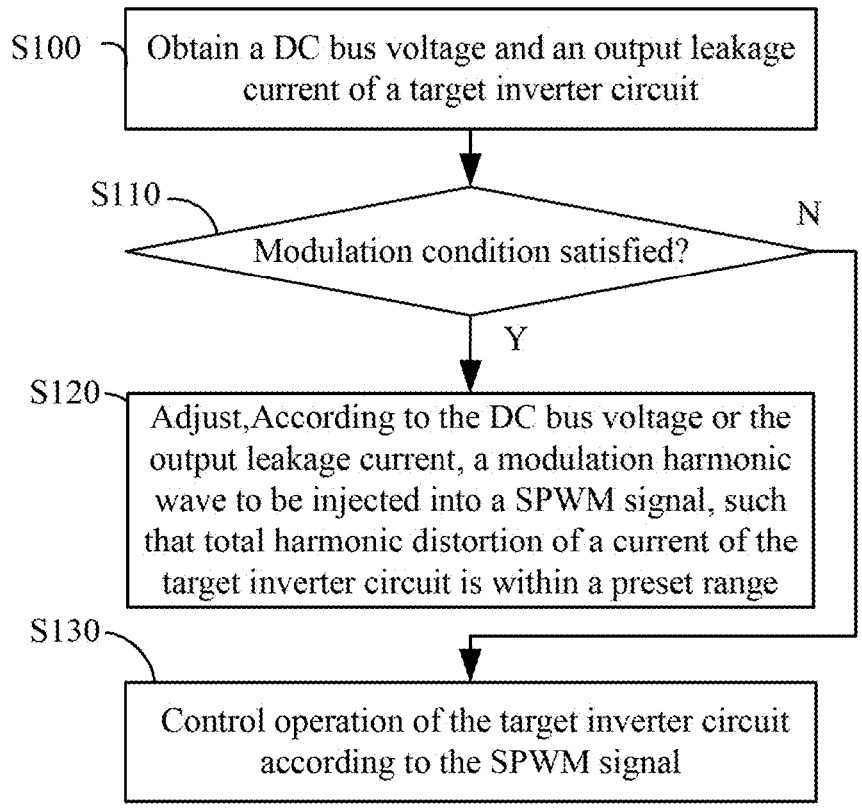
FIG. 2 is a flow chart of an inverter circuit control method according to an embodiment of the present disclosure.

Reference is made to FIG. 2, which is a flow chart of an inverter circuit control method according to an embodiment of the present disclosure. The inverter circuit control method according to the embodiment of the present disclosure includes following steps S100 to S130.

In step S100, a direct current (DC) bus voltage and an output leakage current of a target inverter circuit are determined.

Used herein, the term "target inverter circuit" refers to an inverter circuit for which inverter control is needed in practical applications, and it may be any conventional three-phase N-level inverter circuit, where N is greater than or equal to 3.

Figure 1:
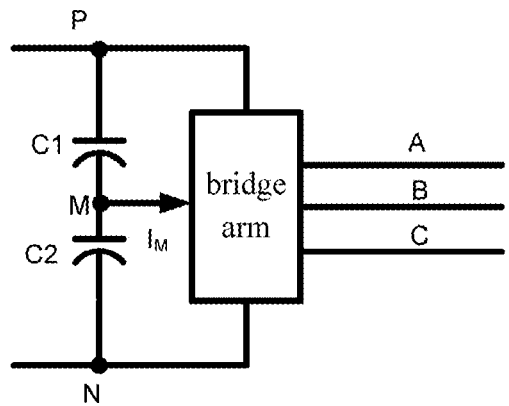
FIG. 1 is a schematic structural diagram of a topology of an N-level inverter in the prior art.

The target inverter circuit for applying the inverter circuit control method provided in the embodiment of the present disclosure is provided with a positive half-loop bus capacitor C1 and a negative half-loop bus capacitor C2 as shown in FIG. 1. Thus the DC bus voltage mentioned in this step specifically includes a positive half-loop bus voltage and a negative half-loop bus voltage.

As used herein, the term "positive half-loop bus" may refer to an upper bus; and the term "negative half-loop bus" may refer to a lower bus. The term "positive half-loop bus voltage" may refer to a voltage on the upper bus, and the term "negative half-loop bus voltage" may refer to a voltage on the lower bus.

The positive half-loop bus voltage, the negative half-loop bus voltage, and the output leakage current of the target inverter circuit may be obtained with conventional scheme, which is not limited in the present disclosure.

In step S110, it is determined according to the DC bus voltage whether the target inverter circuit satisfies a preset modulation condition, a step S120 is executed in case of determining that the target inverter circuit satisfies the preset modulation condition, and a step S130 is executed in a case of determining that the target inverter circuit does not satisfy the preset modulation condition.

The DC bus voltage may include the positive half-loop bus voltage and the negative half-loop bus voltage. In practical applications of the inverter, the DC bus voltage fluctuates with a modulation harmonic wave injected into a SPWM signal. The influence of the modulation harmonic wave on a working state of the inverter circuit may be observed through the change in the DC bus voltage. Therefore, as an optional implementation, after determining the positive half-loop bus voltage and the negative half-loop bus voltage, a difference between the positive half-loop bus voltage and the negative half-loop bus voltage is calculated as a target voltage difference.

Then, an absolute value of the target voltage difference is compared with a preset voltage threshold. It is determined that the target inverter circuit satisfies the preset modulation condition in a case that the absolute value of the target voltage difference is greater than the preset voltage threshold, and the step S120 is executed; on the contrary, it is determined that the target inverter circuit does not satisfy the preset modulation condition in a case that the absolute value of the target voltage difference is less than or equal to the preset voltage threshold, and the step S130 is executed.

It is noted that the preset voltage threshold may be selected flexibly according to control accuracy requirements, capacities of the positive half-loop bus capacitor and the negative half-loop bus capacitor, and specific inverter control parameters, which is not limited in the present disclosure.

In step S120, a modulation harmonic wave to be injected into a SPWM signal is adjusted according to the DC bus voltage or the output leakage current, such that total harmonic distortion of a current of the target inverter circuit is within a preset range.

Once it is determined that the target inverter circuit satisfies the preset modulation condition, the modulation harmonic wave to be injected into the SPWM signal is adjusted according to the DC bus voltage or the output leakage current, such that the total harmonic distortion of the current of the target inverter circuit is within the preset range.

The specific process of the adjustment will be described in subsequent embodiments, which is not described in detail herein.

In step S130, operation of the target inverter circuit is controlled according to the SPWM signal.

If the target inverter circuit does not satisfy the preset modulation condition, it indicates that a current operating state of the target inverter circuit, especially total harmonic distortion of the current of the target inverter circuit satisfies relevant regulations in the industry. In other words, the total harmonic distortion is within the preset range. At this time, there is no need to adjust the SPWM signal, and the target inverter circuit may be controlled according to the SPWM signal configured for the target inverter circuit.

The SPWM signal may be configured for the target inverter circuit with conventional scheme, which is not limited in the present disclosure.

In the inverter circuit control method provided according to the present disclosure, the DC bus voltage and the output leakage current of the target inverter circuit are used as references for adjusting the modulation harmonic wave. The modulation harmonic wave to be injected into the SPWM signal is adjusted according to the DC bus voltage or the output leakage current, thereby ensuring total harmonic distortion of the current of the target inverter circuit to be within the preset range to meet application requirements without increasing capacity of the bus capacitors, that is, without increasing hardware cost.

Figure 3:
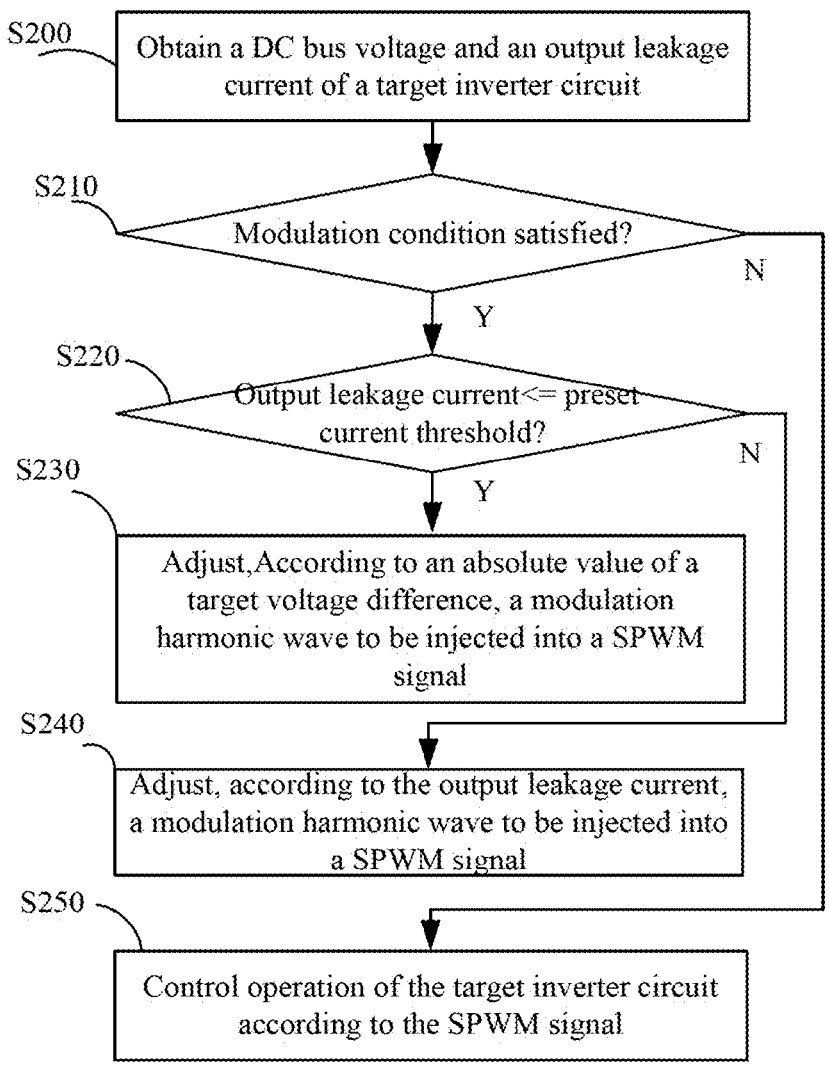
FIG. 3 is a flow chart of an inverter circuit control method according to an embodiment of the present disclosure.

Reference is made to FIG. 3, which is a flow chart of an inverter circuit control method according to an embodiment of the present disclosure. On the basis of the embodiment shown in FIG. 2, an inverter circuit control method according to another embodiment is provided, including following steps S200 to S250.

In step S200, a DC bus voltage and an output leakage current of a target inverter circuit are obtained.

With regard to the implementation of the step S200, reference may be made to the step S100 according to the embodiment shown in FIG. 2, which is not described again herein.

In step S210, it is determined according to the DC bus voltage whether the target inverter circuit satisfies a preset modulation condition, a step S220 is executed in case of determining that the target inverter circuit satisfies the preset modulation condition, and a step S250 is executed in a case of determining that the target inverter circuit does not satisfy the preset modulation condition.

With regard to the implementation of the step S210, reference may be made to the step S110 according to the embodiment shown in FIG. 2, which is not described again herein.

In step S220, it is determined whether the output leakage current is less than or equal to a preset current threshold, a step S230 is executed in case of determining that the output leakage current is less than or equal to the preset current threshold, and a step S240 is executed in a case of determining that the output leakage current is larger than the preset current threshold.

After determining that the target inverter circuit satisfies the preset modulation condition according to the DC bus voltage, it is further determined whether the output leakage current of the target inverter circuit is less than or equal to a preset current threshold. The step S230 is executed in case of determining that the output leakage current is less than or equal to the preset current threshold. And the step S240 is executed in a case of determining that the output leakage current is larger than the preset current threshold.

Similar to the aforementioned preset voltage threshold, the preset current threshold mentioned in this step may be selected flexibly according to control accuracy of the inverter circuit and specific parameters of the target inverter circuit, which is not limited in the present disclosure.

In step S230, a modulation harmonic wave to be injected into a SPWM signal is adjusted according to an absolute value of a target voltage difference.

If the output leakage current of the target inverter circuit is less than or equal to the preset current threshold, the modulation harmonic wave to be injected into the SPWM signal is adjusted according to the absolute value of the target voltage difference.

Optionally, a first preset mapping relationship is provided according to the embodiment of the present disclosure. The first preset mapping relationship records a correspondence relationship between an absolute value of a difference between the positive half-loop bus voltage and the negative half-loop bus voltage and harmonic wave amplitude. And the harmonic wave amplitude is positively correlated with the difference between the positive half-loop bus voltage and the negative half-loop bus voltage, that is, the greater the absolute value of the voltage difference is, the greater the harmonic wave amplitude is.

In practical applications, a target harmonic wave amplitude corresponding to the target voltage difference in the preceding step may be determined based on the first preset mapping relationship, a modulation harmonic wave is generated according to the target harmonic wave amplitude, and the modulation harmonic wave is injected into the SPWM signal.

Optionally, in the first preset mapping relationship, the correspondence relationship between the absolute value of the difference between the positive half-loop bus voltage and the negative half-loop bus voltage and the harmonic wave amplitude may be at least one of a linear correspondence relationship, a non-linear correspondence relationship, and a stepping correspondence relationship. In other words, the correspondence relationship may be any one of the above-mentioned correspondence relationships, or it may be a combination of two or more correspondence relationships. It is noted that regardless of the specific form of the correspondence relationship recorded in the first preset mapping relationship, any record form in which the harmonic wave amplitude is positively correlated to the absolute value of the difference between the positive half-loop bus voltage and the negative half-loop bus voltage is feasible and falls within the scope of the present disclosure without going beyond the principle of the present disclosure.

Figure 4:
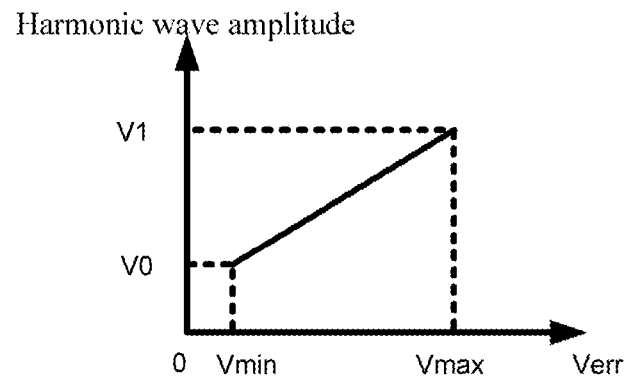
FIG. 4 shows an implementation of a first preset mapping relationship according to an embodiment of the present disclosure.

Optionally, reference is made to FIG. 4, which shows an implementation of a first preset mapping relationship according to an embodiment of the present disclosure. As shown in FIG. 4, the abscissa axis $V_{err}$ represents the absolute value of the difference between the positive half-loop bus voltage and the negative half-loop bus voltage, and the ordinate axis $V_0$-$V_1$ represents the amplitude of the modulation harmonic wave. When controlling the target inverter circuit in combination with the example shown in FIG. 4, when the value of $V_{err}$ is small and the fluctuation of the capacitor voltage is small, an initial third harmonic frequency/triple frequency modulation harmonic wave, namely a modulation harmonic wave with an amplitude of $V_0$, is injected to ensure a higher conversion efficiency of the target inverter circuit. Correspondingly, when the value of $V_{err}$ is large, the amplitude of the modulation harmonic wave is increased according to the example shown in FIG. 4, such that the amount of injected third harmonic frequency/triple frequency modulation harmonic wave becomes larger, and the fluctuation of the bus voltage is reduced.

Optionally, in practical applications, the value of $V_0$ may be 0 or other values greater than 0, and the value of $V_1$ is the maximum value of the harmonic wave amplitude, which is half of a peak voltage of AC power grid.

Figure 5:
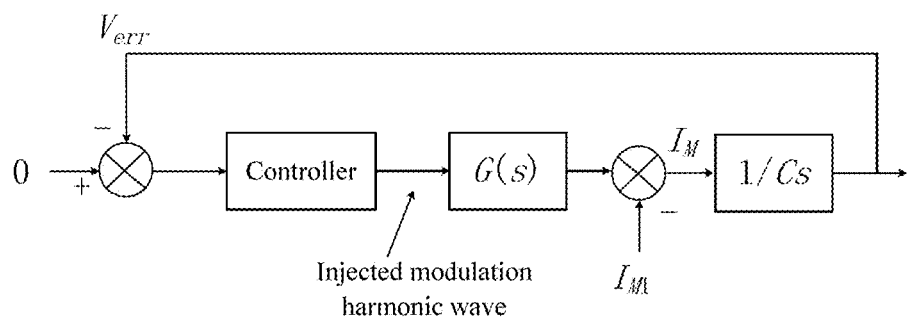
FIG. 5 is a schematic diagram of a closed loop control structure according to an embodiment of the present disclosure.

Optionally, a phase of the modulation harmonic wave to be injected into the SPWM signal may also be adjusted according to the absolute value of the target voltage difference to achieve the same purpose. Reference is made to FIG. 5, which is a schematic diagram of a closed loop control structure according to an embodiment of the present disclosure. As shown in FIG. 5, an output of a controller is the third harmonic frequency/triple frequency modulation harmonic wave to be injected into the SPWM signal. The controller may generally be a proportional resonance (PR) controller since the modulation harmonic wave is an AC element. A resonance frequency of the PR controller is a target frequency, for example, if the fluctuation is at the triple frequency, the resonance frequency is also at the triple frequency.

The amount of the triple frequency components in a current $I_M$ flowing into the target inverter circuit through a midpoint M between the two capacitors C1 and C2 mainly includes two parts. A first part is introduced by the modulation harmonic wave injected in the modulation, and a transfer function from a voltage of the injected third harmonic wave to the current $I_M$ is G(s). A second part is a triple frequency component $I_{M1}$ caused by the topological structure. For closed loop control, the second part of the current is a disturbance, and one purpose of the closed loop control is actually to suppress the influence of the disturbance. According to control theory, in a steady state, the output of the controller is the third harmonic wave to be injected during the modulation, which is $I_{M1}$/G(s). The amplitude and phase of the third harmonic wave to be injected in the modulation are adjusted according to the amplitude and phase of in the closed loop control. Finally, the current component caused by the third harmonic wave in the modulation and $I_{M1}$ cancel each other out, thereby suppressing the triple frequency voltage fluctuation on the DC bus.

In step S240, the modulation harmonic wave to be injected into the SPWM signal is adjusted according to the output leakage current.

The modulation harmonic wave to be injected into the SPWM signal is adjusted according to the output leakage current in a cast that the output leakage current of the target inverter circuit is greater than the preset current threshold.

Optionally, a second preset mapping relationship is provided according to the embodiment of the present disclosure. The second preset mapping relationship records a correspondence relationship between an output leakage current of the target inverter circuit and a harmonic wave amplitude, and the harmonic wave amplitude is negatively correlated with the output leakage current of the target inverter circuit, that is, the greater the output leakage current is, the smaller the harmonic wave amplitude is.

In practical applications, a target harmonic wave amplitude corresponding to the output leakage current of the target inverter circuit obtained in the preceding step may be determined based on the second preset mapping relationship, and an amplitude of the modulation harmonic wave to be injected into the SPWM signal is adjusted to the target harmonic wave amplitude.

Optionally, similarly to the first preset mapping relationship, in the second preset mapping relationship, the correspondence relationship between the output leakage current of the target inverter circuit and the harmonic wave amplitude may be at least one of a linear correspondence relationship, a non-linear correspondence relationship, and a stepping correspondence relationship.

Figure 6:
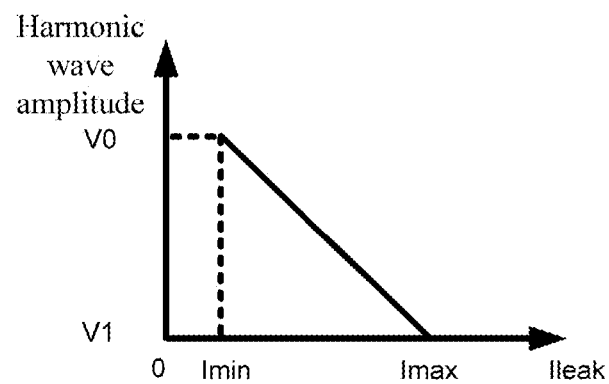
FIG. 6 shows an implementation of a second preset mapping relationship according to an embodiment of the present disclosure.

Specifically, reference is made to FIG. 6, which shows an implementation of a second preset mapping relationship according to an embodiment of the present disclosure. As shown in FIG. 6, the abscissa axis $I_{leak}$ represents the output leakage current of the target inverter circuit, and the ordinate axis $V_0$-$V_1$ represents the amplitude of the modulation harmonic wave. When controlling the target inverter circuit in combination with the example shown in FIG. 6, when the output leakage current is small and the fluctuation of the bus capacitor voltage is small, an initial third harmonic frequency/triple frequency modulation harmonic wave with amplitude of $V_0$ is injected. When the output leakage current is large, the amplitude of the modulation harmonic wave is decreased according to the example shown in FIG. 6, such that the amount of injected third harmonic frequency/triple frequency modulation harmonic wave becomes smaller, and the output leakage current is reduced. The value of $V_0$ may be determined based on simulation results or historical operating data.

In step S250, operation of the target inverter circuit is controlled according to the SPWM signal.

With regard to the implementation of the step S250, reference may be made to step S130 in the embodiment shown in FIG. 2, which is not described again herein.

In summary, since the injection of the modulation harmonic wave into the SPWM signal has a great impact on the DC bus voltage and the output leakage current, the DC bus voltage and the output leakage current of the target inverter circuit are used as references for adjusting the modulation harmonic wave in the inverter control method provided according to the present disclosure. The modulation harmonic wave to be injected into the SPWM signal is adjusted according to the DC bus voltage or the output leakage current, thereby ensuring total harmonic distortion of the current of the target inverter circuit to be within the preset range to meet application requirements without increasing capacity of the bus capacitors, that is, without increasing hardware cost.

Optionally, in practicing any of the above embodiments, especially when adjusting the modulation harmonic wave according to the output leakage current, it is very likely that the DC bus voltage of the target inverter circuit will change. Therefore, in practicing any of the above embodiments, the DC bus voltage may be monitored. If the DC bus voltage is lower than a preset safety threshold, it is to increase the DC bus voltage so as to maintain normal and efficient operation of the inverter circuit.

Optionally, according to an embodiment of the present disclosure there is provided an inverter including an inverter circuit and a controller. The controller is connected to a control end of the inverter circuit, and the controller is configured to implement the inverter circuit control method according to any one of the above embodiments.

Optionally, the inverter circuit comprises a three-phase N-level inverter circuit, where N is greater than or equal to 3. For example, the inverter circuit may be a three-phase three-level inverter circuit, a three-phase five-level inverter circuit, etc.

Figure 7:
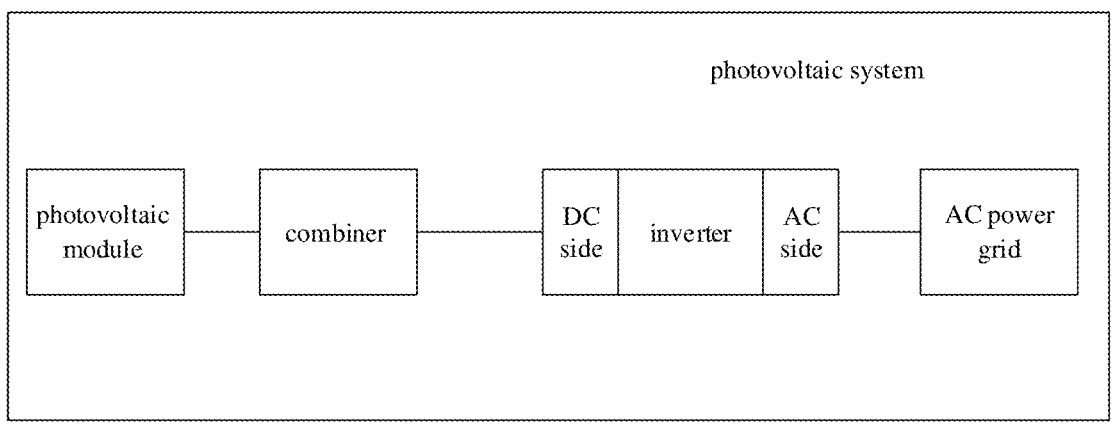
FIG. 7 shows a block diagram of a photovoltaic system according to an embodiment of the present disclosure.

Optionally, according to an embodiment of the present disclosure there is provided a photovoltaic system, as shown in FIG. 7, including at least one photovoltaic module, a combiner, and the inverter according to any one of the above embodiments. An output end of each photovoltaic module is connected to an input end of the combiner, an output end of the combiner is connected to DC side of the inverter; and AC side of the inverter is connected to AC power grid.

The above embodiments in the specification are described in a progressive manner. Each of the embodiments is mainly focused on describing its differences from other embodiments, and references may be made among these embodiments with respect to the same or similar portions among these embodiments. Descriptions of the apparatus disclosed in the embodiments are simple since the apparatus corresponds to the method disclosed in the embodiments, and related explanations can be found in descriptions of the method.

The above embodiments are preferred embodiments of the present disclosure and are not intended to limit the scope of the present disclosure. The embodiments are meant to illustrate the invention but not to limit the invention. It should be understood that, for those skilled in the art, alternations, modifications or equivalent substitutions may be made to the technical solutions of the present disclosure according to the methods and technical solutions above without departing from the scope of the technical solutions of the present disclosure. These alternations, modifications or equivalent substitutions made according to the technical essence of the present disclosure fall within the scope of the present disclosure.

The invention claimed is:

1. An inverter circuit control method comprising:
determining a direct current DC bus voltage and an output leakage current of a target inverter circuit;
determining, according to the DC bus voltage, whether the target inverter circuit satisfies a preset modulation condition; and
adjusting, according to the DC bus voltage or the output leakage current, a modulation harmonic wave to be injected into a sinusoidal pulse width modulation (SPWM) signal in a case that the target inverter circuit satisfies the preset modulation condition, such that total harmonic distortion of a current of the target inverter circuit is within a preset range.

2. The inverter circuit control method according to claim 1, wherein the DC bus voltage comprises a positive half-loop bus voltage and a negative half-loop bus voltage; and the determining whether the target inverter circuit satisfies the preset modulation condition according to the DC bus voltage comprises:
calculating a difference between the positive half-loop bus voltage and the negative half-loop bus voltage as a target voltage difference;
determining that the target inverter circuit satisfies the preset modulation condition in a case that an absolute value of the target voltage difference is greater than a preset voltage threshold; and
determining that the target inverter circuit does not satisfy the preset modulation condition in a case that the absolute value of the target voltage difference is less than or equal to the preset voltage threshold.

3. The inverter circuit control method according to claim 2, wherein the adjusting the modulation harmonic wave to be injected into the SPWM signal according to the DC bus voltage or the output leakage current comprises:
adjusting, according to the absolute value of the target voltage difference, the modulation harmonic wave to be injected into the SPWM signal in a case that the output leakage current is less than or equal to a preset current threshold; and
adjusting, according to the output leakage current, the modulation harmonic wave to be injected into the SPWM signal in a case that the output leakage current is greater than the preset current threshold.

4. The inverter circuit control method according to claim 3, wherein the adjusting the modulation harmonic wave to be injected into the SPWM signal according to the absolute value of the target voltage difference comprises:

determining, according to a first preset mapping relationship, a target harmonic wave amplitude corresponding to the target voltage difference, wherein the first preset mapping relationship records a correspondence relationship of an absolute value of a difference between the positive half-loop bus voltage and the negative half-loop bus voltage with a harmonic wave amplitude, and the harmonic wave amplitude is positively correlated to the difference between the positive half-loop bus voltage and the negative half-loop bus voltage; and adjusting an amplitude of the modulation harmonic wave to be injected into the SPWM signal to be the target harmonic wave amplitude.

5. The inverter circuit control method according to claim 4, wherein in the first preset mapping relationship, the correspondence relationship of the absolute value of the difference between the positive half-loop bus voltage and the negative half-loop bus voltage with the harmonic wave amplitude comprises at least one of a linear correspondence relationship, a non-linear correspondence relationship, and a stepping correspondence relationship.

6. The inverter circuit control method according to claim 4, wherein a maximum value of the harmonic wave amplitude is half of a voltage peak value of alternating current AC power grid.

7. The inverter circuit control method according to claim 3, wherein the adjusting the modulation harmonic wave to be injected into the SPWM signal according to the absolute value of the target voltage difference comprises:

adjusting, according to the absolute value of the target voltage difference, phase of the modulation harmonic wave to be injected into the SPWM signal.

8. The inverter circuit control method according to claim 3, wherein the adjusting the modulation harmonic wave to be injected into the SPWM signal according to the output leakage current comprises:

determining, according to a second preset mapping relationship, a target harmonic wave amplitude corresponding to the output leakage current, wherein the second preset mapping relationship records a correspondence relationship of the output leakage current of the target inverter circuit with a harmonic wave amplitude, and the harmonic wave amplitude is negatively correlated to the output leakage current of the target inverter circuit; and adjusting an amplitude of the modulation harmonic wave to be injected into the SPWM signal to be the target harmonic wave amplitude.

9. The inverter circuit control method according to claim 8, wherein in the second preset mapping relationship, the correspondence relationship of the output leakage current of the target inverter circuit with the harmonic wave amplitude comprises at least one of a linear correspondence relationship, a non-linear correspondence relationship, and a stepping correspondence relationship.

10. The inverter circuit control method according to claim 1, further comprising:
monitoring the DC bus voltage; and
increasing the DC bus voltage in a case that the DC bus voltage is less than a preset safety threshold.

11. The inverter circuit control method according to claim 1, further comprising:

controlling operation of the target inverter circuit according to the SPWM modulation signal in a case that the target inverter circuit does not satisfy the preset modulation condition.

12. An inverter comprising an inverter circuit and a controller, wherein the controller is connected to a control end of the inverter circuit, and the controller is configured for:

determining a direct current DC bus voltage and an output leakage current of the inverter circuit;

determining, according to the DC bus voltage, whether the inverter circuit satisfies a preset modulation condition; and adjusting, according to the DC bus voltage or the output leakage current, a modulation harmonic wave to be injected into a sinusoidal pulse width modulation (SPWM) signal in a case that the target inverter circuit satisfies the preset modulation condition, such that total harmonic distortion of a current of the inverter circuit is within a preset range.

13. The inverter according to claim 12, wherein the inverter circuit is a three-phase N-level inverter circuit, and N is greater than or equal to 3.

14. The inverter according to claim 12, wherein the controller is further configured for:

calculating a difference between a positive half-loop bus voltage and a negative half-loop bus voltage as a target voltage difference;

determining that the target inverter circuit satisfies the preset modulation condition in a case that an absolute value of the target voltage difference is greater than a preset voltage threshold; and determining that the target inverter circuit does not satisfy the preset modulation condition in a case that the absolute value of the target voltage difference is less than or equal to the preset voltage threshold.

15. The inverter according to claim 14, wherein the controller is further configured for:

adjusting, according to the absolute value of the target voltage difference, the modulation harmonic wave to be injected into the SPWM signal in a case that the output leakage current is less than or equal to a preset current threshold; and adjusting, according to the output leakage current, the modulation harmonic wave to be injected into the SPWM signal in a case that the output leakage current is greater than the preset current threshold.

16. The inverter according to claim 15, wherein the controller is further configured for:

determining, according to a first preset mapping relationship, a target harmonic wave amplitude corresponding to the target voltage difference, wherein the first preset mapping relationship records a correspondence relationship of an absolute value of a difference between the positive half-loop bus voltage and the negative half-loop bus voltage with a harmonic wave amplitude, and the harmonic wave amplitude is positively correlated to the difference between the positive half-loop bus voltage and the negative half-loop bus voltage; and adjusting an amplitude of the modulation harmonic wave to be injected into the SPWM signal to be the target harmonic wave amplitude.

17. The inverter according to claim 15, wherein the controller is further configured for:

adjusting, according to the absolute value of the target voltage difference, phase of the modulation harmonic wave to be injected into the SPWM signal.

18. The inverter according to claim 15, wherein the controller is further configured for:
   determining, according to a second preset mapping relationship, a target harmonic wave amplitude corresponding to the output leakage current, wherein the second preset mapping relationship records a correspondence relationship of the output leakage current of the target inverter circuit with a harmonic wave amplitude, and the harmonic wave amplitude is negatively correlated to the output leakage current of the target inverter circuit; and
   adjusting an amplitude of the modulation harmonic wave to be injected into the SPWM signal to be the target harmonic wave amplitude.

19. The inverter according to claim 12, wherein the controller is further configured for:
   monitoring the DC bus voltage; and
   increasing the DC bus voltage in a case that the DC bus voltage is less than a preset safety threshold.

20. A photovoltaic system comprising at least one photovoltaic module, a combiner, and an inverter, wherein an output end of each photovoltaic module is connected to an input end of the combiner, an output end of the combiner is connected to DC side of the inverter, and AC side of the inverter is connected to AC power grid, wherein the inverter comprises an inverter circuit and a controller, wherein the controller is connected to a control end of the inverter circuit, and the controller is configured for:
   determining a direct current DC bus voltage and an output leakage current of the inverter circuit;
   determining, according to the DC bus voltage, whether the inverter circuit satisfies a preset modulation condition; and
   adjusting, according to the DC bus voltage or the output leakage current, a modulation harmonic wave to be injected into a sinusoidal pulse width modulation (SPWM) signal in a case that the target inverter circuit satisfies the preset modulation condition, such that total harmonic distortion of a current of the inverter circuit is within a preset range.

* * * * *